United States Patent [19]

Notagashira et al.

[11] Patent Number: 5,077,569
[45] Date of Patent: Dec. 31, 1991

[54] CLOSE-UP PHOTOGRAPHY DEVICE

[75] Inventors: Hidefumi Notagashira; Masaaki Ishihara, both of Kanagawa; Sinichi Tsujimoto, Tokyo, all of Japan

[73] Assignee: Canon Kabushiki Kaisha, Tokyo, Japan

[21] Appl. No.: 389,186

[22] Filed: Aug. 3, 1989

[30] Foreign Application Priority Data

Aug. 11, 1988 [JP] Japan .............................. 63-200720
Aug. 11, 1988 [JP] Japan .............................. 63-200722
Aug. 11, 1988 [JP] Japan .............................. 63-200723

[51] Int. Cl.$^5$ .................................................. G03B 1/18
[52] U.S. Cl. ........................... 354/195.12; 354/286; 354/289.11; 359/694
[58] Field of Search ........... 354/195.1, 195.11, 195.12, 354/286, 289.1, 289.11, 289.12, 295, 187; 350/427, 428, 429, 430

[56] References Cited

U.S. PATENT DOCUMENTS

| 4,792,822 | 12/1988 | Akiyama et al. | 354/195.12 X |
| 4,831,396 | 5/1989 | Hiesinger et al. | 354/195.1 |
| 4,870,436 | 9/1989 | Tanaka | 354/195.1 |
| 4,894,672 | 1/1990 | Tanaka | 354/195.12 |

Primary Examiner—Brian W. Brown
Attorney, Agent, or Firm—Robin, Blecker, Daley & Driscoll

[57] ABSTRACT

A close-up photography device includes an intermediate device of extensible and retractable type adapted to be mounted on a camera body, and a lens barrel for close-up photography adapted to be mounted on the intermediate device and arranged to be able to vary at least a focal length for variable-magnification photography. The intermediate device has a first moving member arranged to move according to the amount of extension or retraction. The lens barrel has a second moving member arranged to move to vary the focal length. The first moving member and the second moving member are arranged to be interlocked with each other when the lens barrel is mounted on the intermediate device. An interlocking relation between the first moving member and the second moving member are set so that the focal length of the lens barrel is varied so as not to change a focusing state at an image forming position of the camera body by the extension or retraction of the intermediate device.

12 Claims, 13 Drawing Sheets

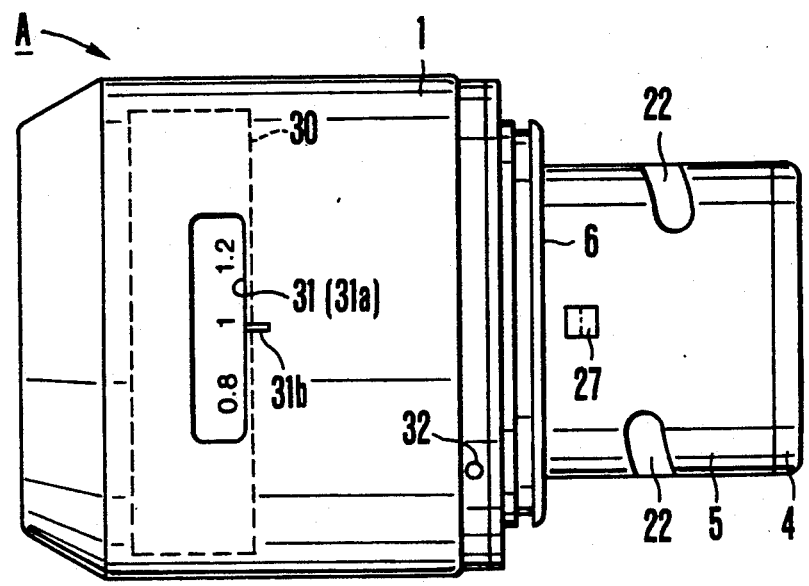
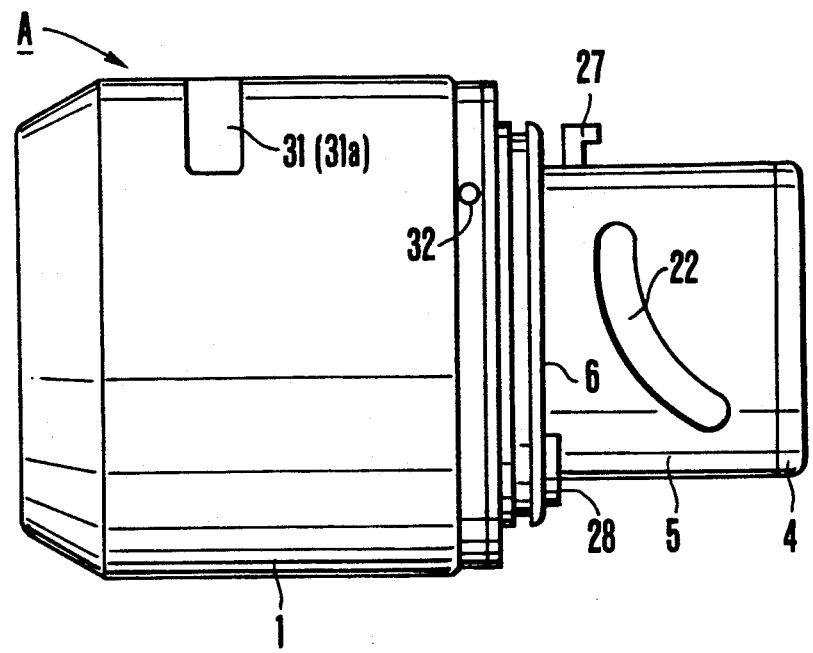

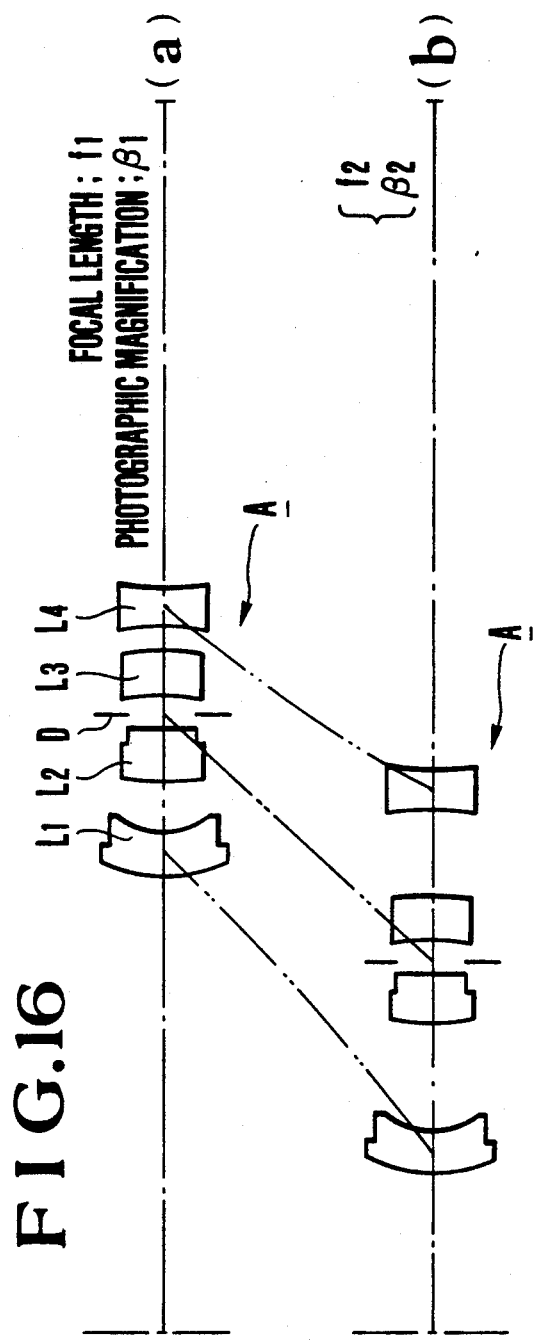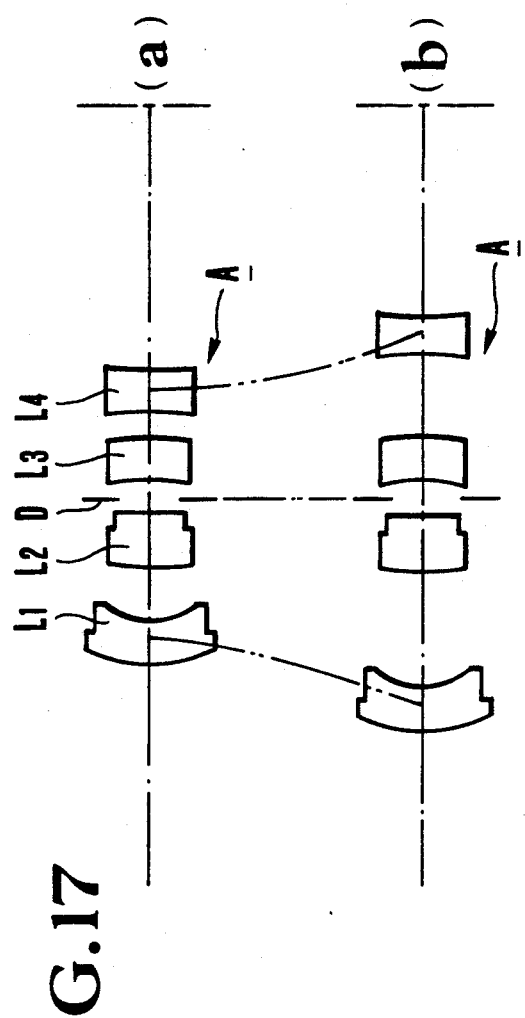

CLOSE-UP PHOTOGRAPHY DEVICE

BACKGROUND OF THE INVENTION

1. Field of the Invention

This invention relates to close-up photography devices for use in either close-up photography or macro photography of an object.

2. Description of the Related Art

In photography exceeding 0.2×magnification but below about 10×, or so-called close-up photography, intermediate device has been used to widen the distance between the film plane in the camera and the photographic lens (lens barrel). As this intermediate device, generally the bellows-type extension device expansively connecting the mount coupler on the camera with the mount coupler on the lens barrel through a bellows of light shielding material, or the so-called intermediate tube intervening between the camera body and the photographic lens is widely used. Since, the photographic magnification is determined by the amount of extension of the photographic lens, with the former or in the case of the bellows type, by adjusting the extension of the bellows, while with the latter, or in the case of the tube, by altering the tube length, the photographic magnification is set to a desired value before shooting.

FIG. 4(a), FIG. 4(b) and FIG. 4(c) are diagrams of a model to explain the correlation of the amount of extension d of the photographic lens and the photographic magnification $\beta$.

The photographic lens L of focal length f forms an image Y of an object $Y_0$ on a film plane F as the image plane. "a" denotes the object distance (the distance between the photographic lens L and the object $Y_0$). "b" the image distance (the distance between the photographic lens L and the film plane F), and "l" the shooting distance (the distance between the object $Y_0$ and the film plane F).

FIG. 4(a) shows a position of the photographic lens L where the amount of extension d=0, or the focus of the lens L lies on the film plane F so that the photographic magnification $\beta = 1/\infty$. FIG. 4(b) and FIG. 4(c) show different focusing movements of the lens L, FIG. 4(b) being depicted for about 1× photographic magnification, and FIG. 4(c) for 2× one.

The, the photographic magnification $\beta$, the shooting distance "l" and the object distance "a" are correlated to each other by the following equations:

$$\beta = Y/Y_0 = b/a = d/f \ldots \quad (1)$$

$$l = f(1+\beta)^2/\beta \ldots \quad (2)$$

Rearranging the equation (2) with the shooting distance l as a constant, the functions for f and $\beta$ are obtained, graphically shown in FIG. 1. If, as the amount of extension d of the lens (the amount of increased distance between the photographic lens and the film plane (image plane) measured from the position for the photographic magnification of $1/\infty$), increases, the focal length f of the photographic lens L is made to alter in such a way that it first increases and then decreases, the photographic magnification can monotonously be increased without having to vary the shooting distance l.

Since the optical equation (2) is the image forming equation, the image plane of sharp focus is not caused to shift by varying the forward movement d.

FIG. 2 is a diagram of an optical system model exemplifying a varifocal photographic lens as the photographic lens L, comprising lens groups $L_1$, $L_2$, $L_3$ and $L_4$ each consisting of one lens element or a plurality of lens elements. D stands for a diaphragm. By moving all of the first lens group $L_1$, the second lens group $L_2$, the third lens group $L_3$, the fourth lens group $L_4$ and the diaphragm D, the focal length f is varied, or variation of magnification is effected.

The operating positions (a), (b) and (c) shown in FIG. 2 have values $f_1$, $f_2$ and $f_3$ of the focal length f of the lens L respectively, which lie on the graph of FIG. 1. The optical arrangements of (a) and (c) are conjugate to each other where the relationships of $f_1 = f_3$ and $1/\beta_1 = \beta_3$ are established. Also, $\beta_2 = 1\times$. When varying the magnification, the second lens group $L_2$, the third lens group $L_3$ and the diaphragm D linearly move in unison, while the first lens group $L_1$ and the fourth lens group $L_4$ move entirely symmetrically to each other with respect to the second lens group $L_2$, the third lens group $L_3$ and the diaphragm D so that at the position (b) of unity magnification, the variable lens spacings both become shortest. Further, the first lens group $L_1$ and the fourth lens group $L_4$ are so arranged that their movement on the optical axis o-o relative to the second lens group $L_2$, the third lens group $L_3$ and the diaphragm D from the photographic magnification $\beta_1$ to the $\beta_2$ (life-size) is equalized to that from the $\beta_3$ to the $\beta_2$ (life-size). In other words, the positions for each of the aforesaid values of the photographic magnification of the first lens group $L_1$ and the fourth lens group $L_4$ relative to the second lens group $L_2$, the third lens group $L_3$ and the diaphragm D vary as shown in FIG. 3. Also, at that discrete values of the photographic magnification and any other values therebetween, the distance between the object and the predetermined image plane is always constant, so that once the sharp focus has been established, later alteration of the magnification does not require re-adjustment of the focus.

In close-up photography, to make the optical system move in the above-described way as shown in FIG. 2 and FIG. 3, while the movement of the second lens group $L_2$, the third lens group $L_3$ and the diaphragm D is done by the bellows (intermediate device), the movement of the first lens group $L_1$ and the fourth lens group $L_4$ should be done by operating a cam mechanism mounted on the movable side of the bellows. Thus, the movement of the first lens group $L_1$ and the fourth lens group $L_4$ shown in FIG. 2 is realized by the combined motion of the bellows and the cam mechanism.

The general form of the cam mechanism for this purpose is shown in an expanded view of FIG. 14. A fixed portion 201 has a straight slot 201a of direction along the optical axis o-o. A cam tube 202 is only rotatably supported relative to the fixed portion 201. A cam slot 202a is formed in the cam tube 202. A reference numeral 203 is a pin of a movable lens group tube. The motion of this pin 203 is the same as that of the magnification varying lens group ($L_1$ or $L_4$) held in the movable lens group tube. The aforesaid pin 203 penetrates the straight slot 201a of the fixed portion 201 and fits in the cam slot 202a of the aforesaid cam tube 202. In this state, when the cam tube 202 rotates in a direction of arrow B, the pin 203 is moved first in a direction of arrow C and then in the opposite direction of arrow E. Therefore, the magnification varying lens group, too, is moved in a similar way to that of the pin 203.

As has been described, such a movement of the first lens group $L_1$ and the fourth lens group $L_4$ is realized.

By the way, with the conventional simple extension device of the bellows type or the tube type, when the photographic magnification $\beta$ is altered, the shooting distance 1 is caused to change. Therefore, the camera position has to be changed along with it.

That is, when the photographic magnification $\beta$ is altered by varying the amount of extension d of the lens, the shooting distance 1 changes by the equation (2) mentioned before. This means that the distance 1 from the object $Y_0$ to the film plane F, or the position of the camera, must be altered. In close-up photography, because the photographic magnification $\beta$ is high, when shooting, camera shake is apt to occur. Also, for another reason that keeping hold of an image of a very small object within the picture frame becomes difficult, generally, a tripod or other stabilizing device is used for the purpose of maintaining the camera or the close-up photography device stationary during shooting. Hence, the operation of adjusting the position of the camera to the sharp focus again in accordance with change of the shooting distance 1 resulting from the alteration of the photographic magnification tends to carry the stabilizing device such as a tripod itself away from the current position. To do this, the stabilizing device such as a tripod and its load, namely, the camera, the photographic lens and the intermediate device for close-up photography, totaling a very heavy weight, are troublesome to displace. Also, as this displacement often makes the very small object out of alignment with the picture frame, determination of the composition must be made again, and focusing must be carried out. It is inconvenient to resume all the preparation prior to making an exposure. Further, by vibrations produced when moving the stabilizing device such as a tripod, the very small object moves away, thus disturbing a set state for shooting. Unfavorable situations like this may be encountered with a high possibility.

In short, it has been the conventional practice that in the case of using the intermediate device in combination with a varifocal photographic lens attached thereto, each time the intermediate device is operated, a very inconvenient process must be carried out which comprises the steps of detecting the amount of extension d the lens has moved forward by reading the scale on the intermediate device and then controlling the varifocal photographic lens in accordance with the detected amount of extension d to adjust its focal length to a predetermined value. Also, during doing this, a manipulation mistake is apt to occur. Incidentally, the idea that the optical system is moved so as merely not to change the focus state when varying the magnification is known in Japanese Laid-Open Patent Application No. Sho 63-189848.

Also, in the structure of the cam mechanism exemplified in FIG. 14, a large angle $\Theta$ the tangent direction of the cam makes with the straight slot 201a is required to make the movement of the pin 203 smooth. This tends to increase the length L in the circumferential direction of the cam slot 202a. In general, a plurality of cam mechanisms of these members must be arranged. To increase the length L is to produce a problem in space. Also, as the length L in the circumferential direction of the cam tube decreases, the angle the tangent direction of the cam slot makes with the straight slot 201a decreases, causing the pin to become difficult to move and further causing the position accuracy of the pin to become worse which in turn lowers the position accuracy of the movable lens group, too, thus giving a problem in that the optical performance deteriorates.

Also, the bellows have generally a distance scale on the rail thereof for assistance in adjusting the photographic magnification. With the help of this distance scale, the photographer reads the amount of extension d of the bellows. And, from the read value of the amount of extension d and the focal length of the lens, he calculates the photographic magnification $\beta$. It is also general that along with the distance scale, there are displayed values of the magnification when the exclusive lens is in use. In this case, there is no need to read the amount of extension d and calculate the resultant value of the photographic magnification $\beta$ (as, for example, disclosed in Japanese Patent Publication No. Sho 58-7372.).

However, since, in the above-described conventional example, the distance scale or the magnification display is on the top surface or side surface of the rail, the bellows becomes a hindrance in confirming the current value on the distance scale or by the magnification display from the position the photographer's eye usually takes. So he is obliged to look either right from the side, or diagonally from the upper side. Hence the visual confirmability is very poor.

Also, as one of the important factors for realizing the close-up photography device based on the above-described principle of variation of the magnification while still preserving high reliability and accuracy, mention may be made of assurance of the desired accuracy with which the interlocking members of the intermediate device and the lens barrel (variable magnification lens, varifocal photographic lens), when coupled with each other, are initially set, and removal of the "play" such as mechanical backlash.

SUMMARY OF THE INVENTION

One aspect of this invention is to provide for a close-up photography device with moving means operating in such a manner that as the intermediate device extends or retracts from one terminal end of a range of movement to the other, the variable magnification lens group is first moved from a first position to a second position by a cam of cam means and then in the reversed direction from the second position to the first position to thereby return on the locus of that cam, thus improving the smoothness of close-up photographic operation and the accuracy of position control.

Other objects of the invention will become apparent from the following detailed description.

BRIEF DESCRIPTION OF THE DRAWINGS

FIG. 7 and FIG. 8 are top and side views of the photographic lens respectively.

FIG. 16 and FIG. 17 are diagrams of an optical system model of the varifocal photographic lens based on the graph of FIG. 15.

DETAILED DESCRIPTION OF THE PREFERRED EMBODIMENT

Figure 5:
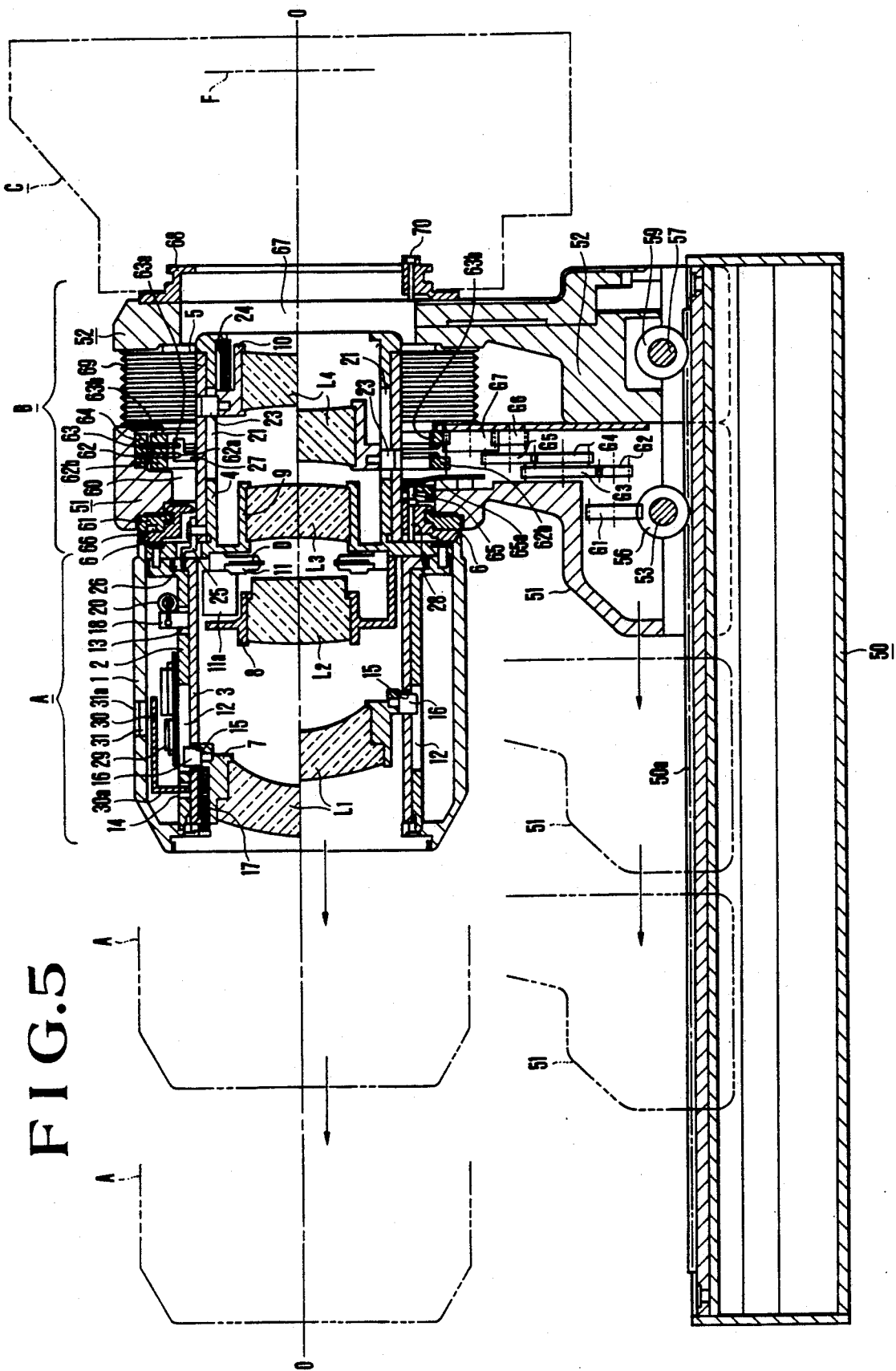
FIG. 5 is a longitudinal side section view of a close-up photography device with the photographic lens attached thereto according to the invention.

FIG. 5 is a longitudinal side section view of the close-up photography device with the lens barrel according to the invention. A reference character A generally denotes the varifocal photographic lens (hereinafter abbreviated to the "photographic lens") as the lens barrel. Another reference character B generally denotes the intermediate device (bellows). C stands for the camera. Concerning the camera C, its contour is shown by double dot-and-single dash lines and its detailed structure is omitted.

Figure 6:
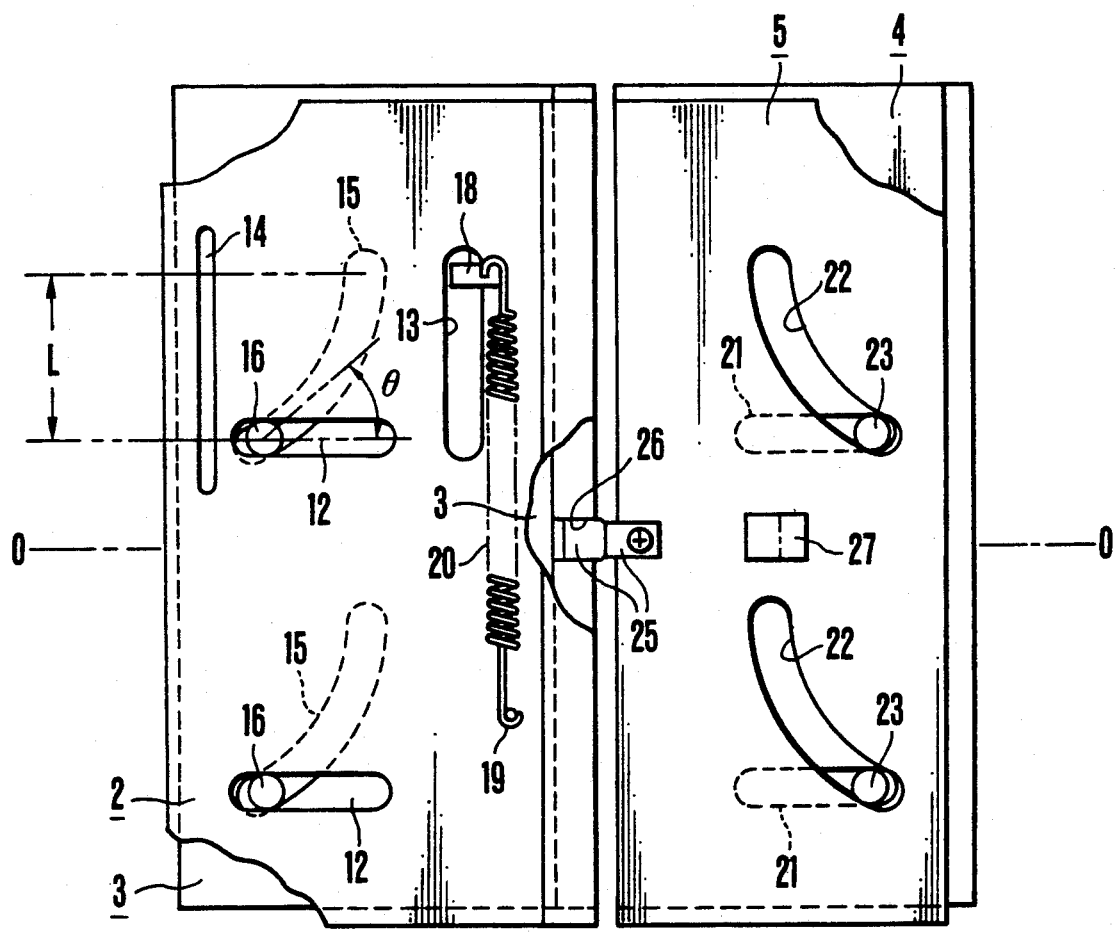
FIG. 6 is an expanded plan view of the main parts (cam mechanism) of the photographic lens.

I. The construction of the photographic lens A:

In the longitudinal side section view of FIG. 5, the expanded plan view of the main parts of FIG. 6, the top plan view of FIG. 7 and the side elevation view of FIG. 8, a guide tube 2 is concentrically mounted in the inner diameter of an exterior ring 1 with an annular gap therebetween in fixedly unified or secured relation by screw fasteners. A front group cam tube 3 is concentrically fitted in the inner diameter of the guide tube 2 and can freely rotate about the optical axis o-o in the normal or reverse direction within the inside of the guide tube 2. A fixed tube 4 is fixedly mounted in unison on the rear end of the guide tube 2 in axial alignment by screw fasteners and is arranged to protrude rearwardly of the rear end of the exterior ring 1. A rear group cam tube 5 is concentrically fitted on the outer diameter of the fixed tube 4 and can freely rotate about the optical axis in the normal or reverse direction. An annular mount 6 for coupling with the intermediate device B is mounted at the rear end position of the exterior ring 1 in fixedly secured relation to a flanged portion of the front end of the fixed tube 4. Hence, the exterior ring 1, the guide tube 2, the fixed tube 4 and the mount 6, totaling four members, are unified with one another, constituting one body.

A first lens group tube 7 holding the first lens group $L_1$ therein is concentrically fitted in the inner diameter of the front group cam tube 3 on the front end portion side. A second lens group tube 8 holding the second lens group $L_2$ therein is supported on the front end of the fixed tube 4 in fixedly secured relation, and lies in concentrically protruding relation into the interior of front group cam tube 3 on the rear end portion side.

A third lens group tube 9 is formed in the front end side of the aforesaid fixed tube 4 within that fixed tube 4 concentrically with that fixed tube 4 in unison with that fixed tube 4, and holds the third lens group $L_3$. A fourth lens tube 10 is fitted in the inner diameter of the rear end side of the fixed tube 4, holding the fourth lens group $L_4$. A diaphragm unit 11 is arranged in a position between the aforesaid second and third lens group tubes 8 and 9 to be supported on the fixed tube 4 side in unified relation, including a stepping motor 11a by which the diaphragm D is driven.

In the wall of the guide tube 2, as shown in the expanded plan view of FIG. 6, there are provided two straight slots 12 parallel to each other and to the optical axis (to the mother line of the tube surface) in about 180° opposite angular positions to each other and first and second circumferential slots 13 and 14 parallel to each other in perpendicular or circumferential direction to the straight slots 12. Also, in the wall of the front group cam tube 3 fitted in that guide tube 2, helical cam slots 15 are formed in about 180° opposite angular positions to each other. And, pin shafts 16 are planted on the first lens group tube 7 fitted in that front cam tube 3 at about 180° opposite angular positions, these pin shafts each engaging both of the respective helical cam slot 15 of the front cam tube 3 and the respective straight slot 12 of the guide tube 2 in penetrating relation at the crossed parts thereof. Therefore, the first lens group tube 7 or the first lens group $L_1$ axially moves forward or rearward within the front group cam tube 3 when the front group cam tube 3 is rotated about the optical axis in the normal or reverse direction relative to the guide tube 2. A front group urging spring 17 is tensioned between the front end portion of the exterior ring 1 and the first lens group tube 7, urging the first lens group tube 7 always in a direction to move forward within the front group cam tube 3.

A projection member 18 is formed on the outer surface of the front group cam tube 3 in unison. Its front end portion passes through the first circumferential slot 13 of the guide tube 2 and extends outwardly of the outer surface of the guide tube 2. A pin 19 is planted on the outer surface of the guide tube 2. A cam tube driving spring 20 is tensioned between this pin 19 and the aforesaid projection member 18. This cam tube driving spring 20 urges the front group cam tube 3 to turn about the optical axis within the guide tube 2 always in a clockwise direction (normal direction) as viewed from the front (first lens group $L_1$ side) of the photographic lens A.

Meanwhile, in the wall of the fixed tube 4, as shown in the expanded plan view of FIG. 6, two straight slots 21 are formed in parallel to the optical axis (to the mother line of the tube surface) at about 180° opposite angular positions to each other. Also, in the wall of the rear group cam tube 5 fixed on the outer diameter of that fixed tube 4, there are provided two helical cam slots 22 at about 180° opposite angular positions to each other. And, pin shafts 23 are planted on the circumference of the fourth lens group tube 10 fitted in the inner diameter of the fixed tube 4 at about 180° opposite angular positions to each other. These pin shafts 23 and 23 each engage both of the respective straight slot 21 of the fixed tube 4 and the respective helical cam slot 22 past the crossed portions thereof. Therefore, the fourth lens group tube 10 or the fourth lens group $L_4$ axially moves forward or rearward within the fixed tube when the rear group cam tube 5 is turned about the optical axis in the normal or reverse direction relative to the fixed tube 4. A rear group urging spring 24 is tensioned between the rear end portion of the fixed tube 4 and the fourth lens group tube 10, urging the fourth lens group tube 10 to move always rearward within the fixed tube 4.

A key member 25 is fixedly mounted at its one end on the outer surface of the front end side of the rear group cam tube 5, and its other end is engaged by inserting into a cutout groove portion 26 formed in a rear end flange portion of the front group cam tube 3. Therefore, between the rear cam tube 5 and the front group cam tube 3, a rotating power is transmitted through the key member 25 so that when one of them rotates in the normal or reverse direction, the other also rotates in the normal or reverse direction.

An interlocking pawl 27 to be used with the intermediate device B is provided on the outer surface of the rear cam tube 5 in unison.

An electrical signal pin assembly 28 is provided in the mount 6 for coupling.

A circuit unit 29 is snugly fitted in the gap space between the exterior ring 1 and the guide tube 2 in fixedly secured relation to the outer surface of the guide tube 2, and is electrically connected to the aforesaid diaphragm unit 11 and the electrical signal pin assembly 28 through lead wires (not shown) and a flexible printed circuit board (not shown).

A magnification display plate 30 of arcuate shape along the longitudinal length concentric to the optical axis is snugly fitted in the gap space between the exterior ring 1 and the guide tube 2. A downward bent leg portion 30a in unified form with that display plate 30 is supported on the front group cam tube 3 by passing through the second circumferential slot 14 of the guide tube 2 and fixedly mounting in unison on the outer surface of the front group cam tube 3 fitted in the inner diameter of the guide tube 2. Therefore, the magnification display plate 30 rotates about the optical axis in the normal or reverse direction when the front group cam tube 3 is rotated in the normal or reverse direction.

A window hole 31 is provided in the outer surface of the exterior ring 1. A dust-proof transparent cover member 31a is arranged to cover this window hole 31. From this window hole 31, the magnification numbers displayed on the outer surface of the aforesaid magnification display plate 30 can be viewed.

A fixed index 32 (FIG. 7 and FIG. 8) on the outer surface of the rear end side of the exterior ring 1 is a mark for alignment when the photographic lens A is attached to the intermediate device B.

Figure 1:
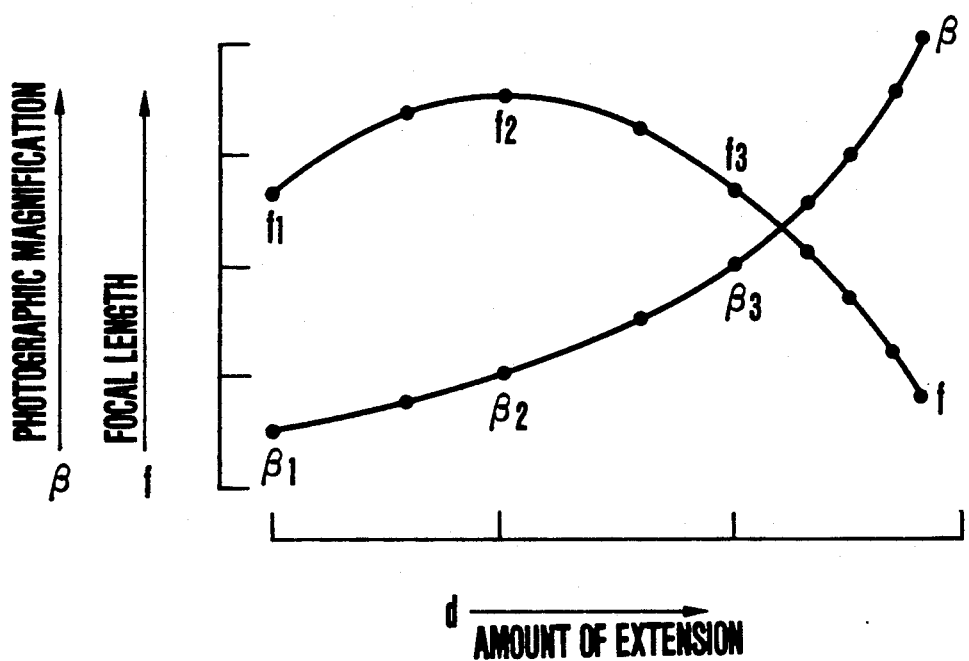
FIG. 1 is a graph of the operational principle of close-up photography.
Figure 2:
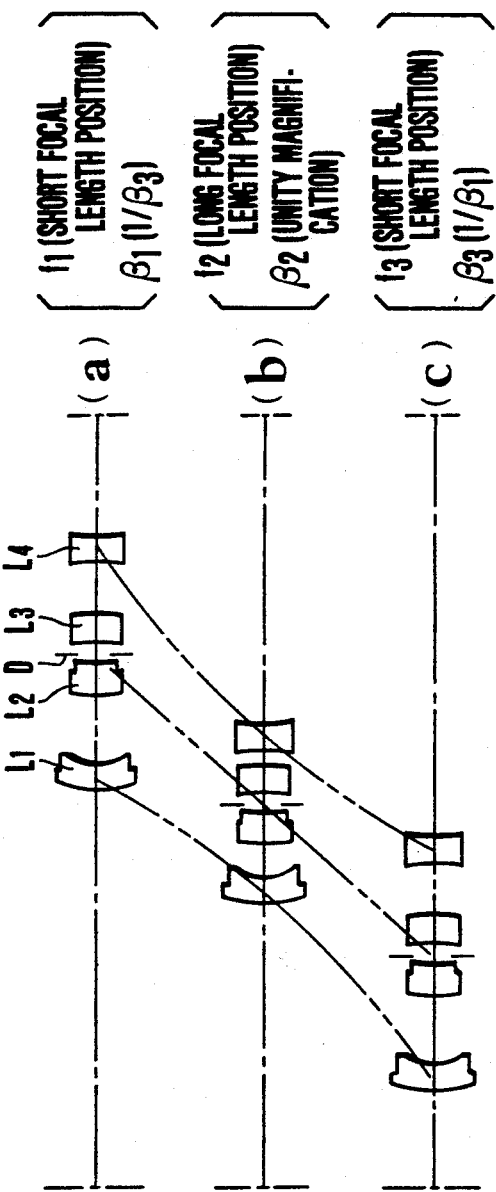
FIG. 2 and FIG. 3 are diagrams of an optical system model of the varifocal photographic lens.
Figure 3:
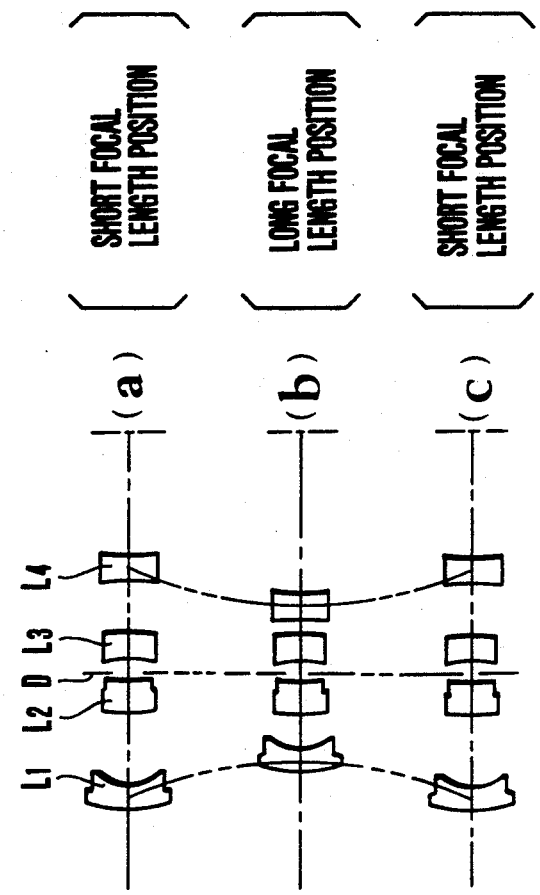
Figure 4A:
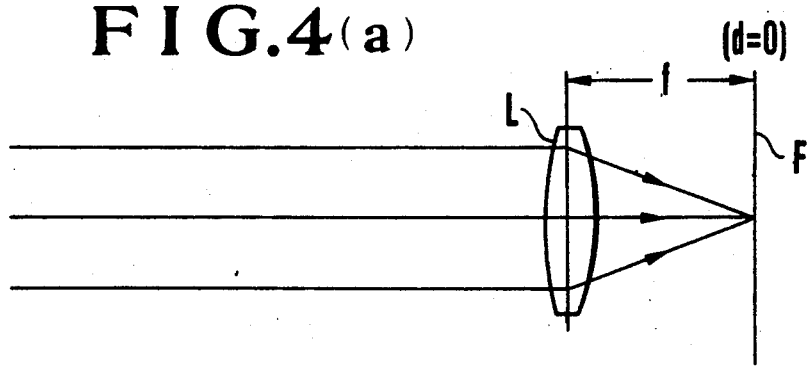
FIG. 4(a), FIG. 4(b) and FIG. 4(c) are diagrams of a correlation model of the amount of extension of the lens with the photographic magnification.
Figure 4B:
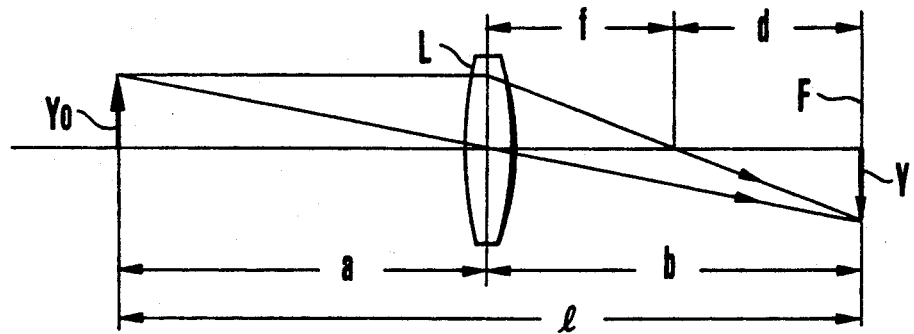
Figure 4C:
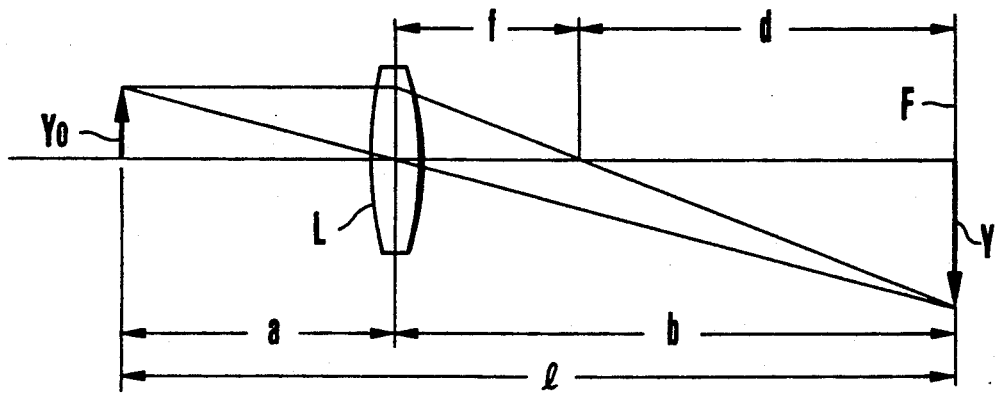

The first to fourth lens groups $L_1$-$L_4$ and the diaphragm D correspond to the aforesaid first to the fourth lens groups $L_1$-$L_4$ and the diaphragm D in FIG. 2 and FIG. 3. By rotating the rear group cam tube 5 in the normal or reverse direction relative to the fixed tube 4, the first lens group tube 7 or the first lens group $L_1$ and the fourth lens group tube 10 or the fourth lens group $L_4$, in response thereto, move along the optical axis in a direction to get away respectively from the second lens group $L_2$ and the third lens group $L_3$ which are stationary (the first lens group $L_1$ moves forward along the optical axis, while the fourth lens group $L_4$ conversely moves rearward), or in a direction to approach the second lens group $L_2$ and the third lens group $L_3$ (the first lens group $L_1$ moves rearward along the optical axis, while the fourth lens group $L_4$ conversely moves forward) so that the lens group array varies continuously to the array of the short focal length state (the array state of the magnification $\beta_1$ or $\beta_3$) of (a) and (c) of FIG. 2 and (a) and (c) of FIG. 3, or the array of the long focal length state (the array state of the magnification $\beta_2$ (unity magnification)) of (b) of FIG. 2 and (b) of FIG. 3.

In the longitudinal side section view of the device of FIG. 5, concerning the first to the fourth lens groups $L_1$-$L_4$ and the diaphragm D of the photographic lens A, with respect to the optical axis o-o as the boundary, the upper half above the optical axis shows the relative array for the short foal length state of the magnification $\beta_1$ or $\beta_3$, and the lower half shows the relative array of the long focal length state of the magnification $\beta_2$ (unity magnification).

Figure 9:
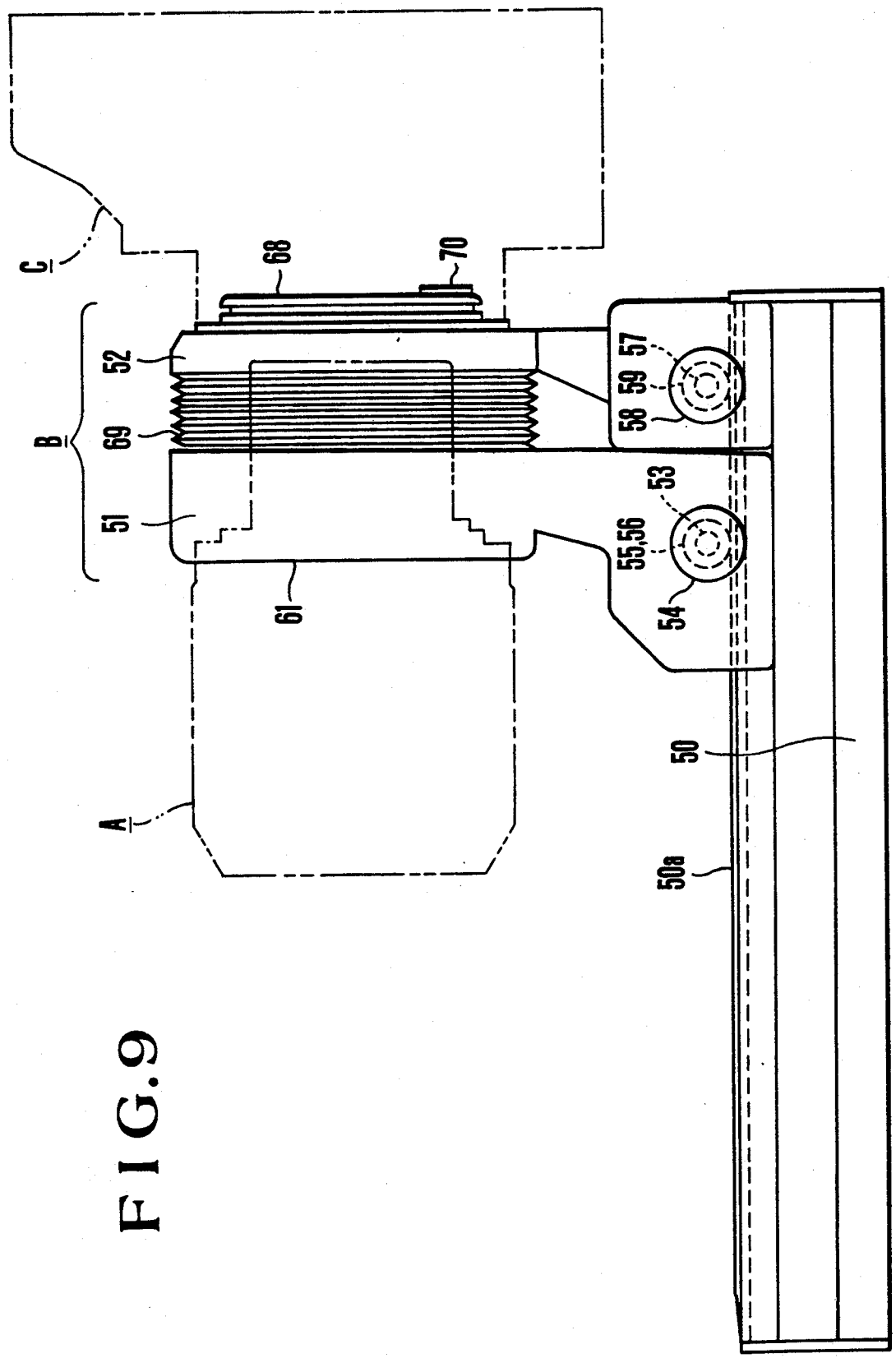
FIG. 9 is a side view of the intermediate device (bellows).
Figure 10:
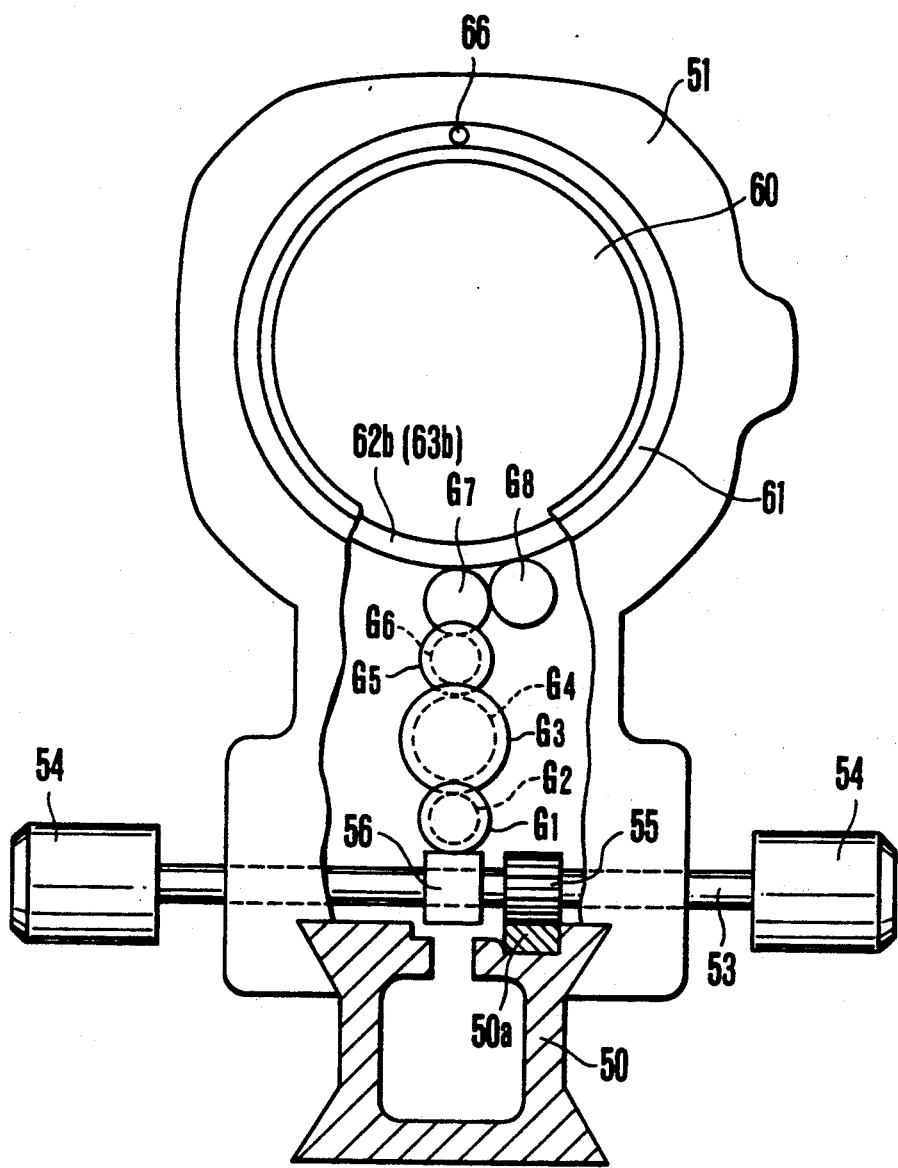
FIG. 10 is a front view of the intermediate device with a portion broken away.
Figure 11:
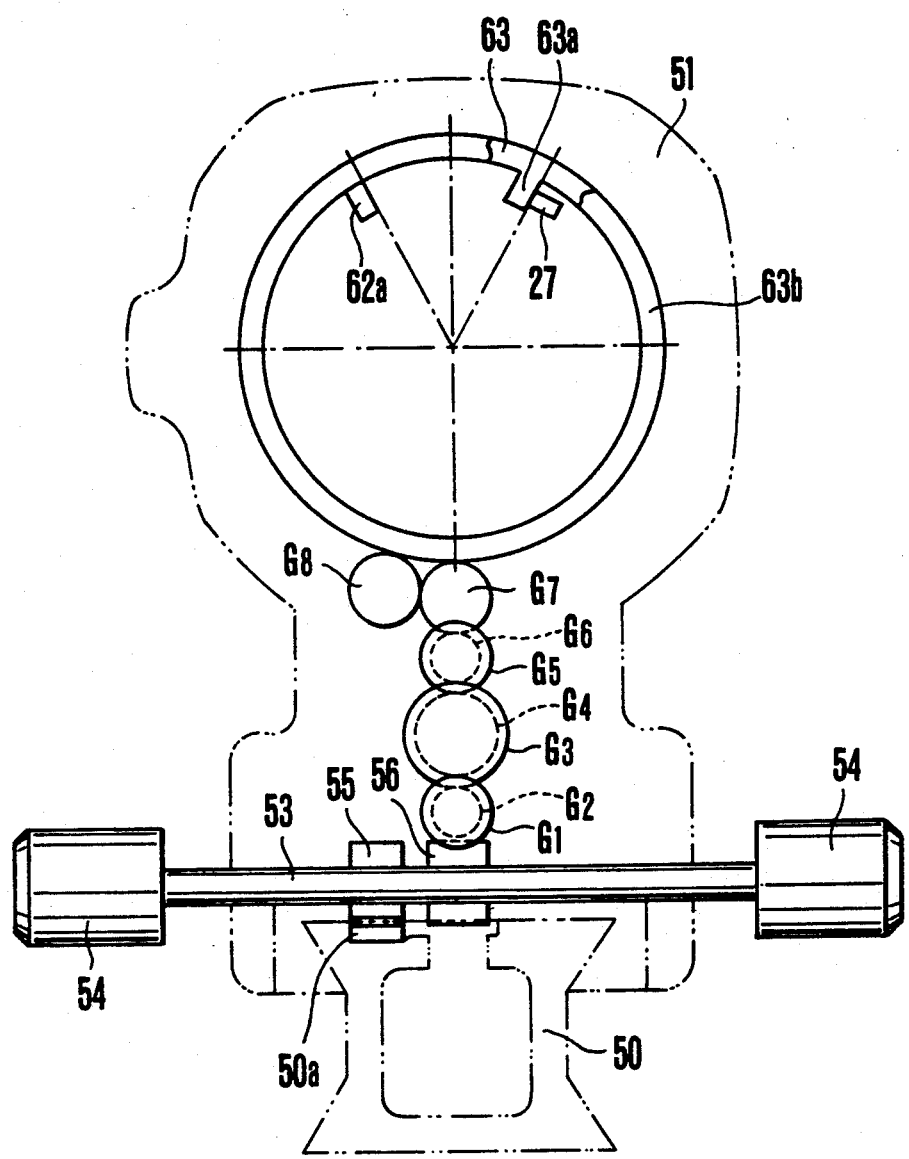
FIG. 11, FIG. 12 and FIG. 13 are similar to FIG. 10 except that the relation in which an interlocking pawl of the photographic lens side and an interlocking pawl of the intermediate device side engage each other is illustrated.

II. The construction of the intermediate device B:

In the longitudinal side section view of FIG. 5, the side view of FIG. 9, and the partly cut-out front view of FIG. 10, a guide rail member 50 of axially long length has a rack 50a provided on its upper surface along the longitudinal direction in fixedly secured relation. A support member 51 for coupling with the photographic lens (hereinafter described as the first support member) is installed on the aforesaid guide rail member 50 in such a way that its base side engages in dovetail slots-fitting relation to the rail member 50 so that it freely moves slidingly forward or rearward smoothly, stably along the longitudinal length of the rail member 50. A camera coupling support member 52 (hereinafter described as the second support member) is installed behind the aforesaid first support member 51 likewise on the guide rail 50 with its base side in dovetail slots-fitting relation to the rail member 50 so that it freely moves slidingly forward or rearward along the longitudinal length of the rail member 50 smoothly and stably.

A drive knob shaft 53 is arranged on the base side of the first support member 51 to horizontally penetrate that member 51 and to be rotatably borne. Knobs 54 are fixedly mounted on left and right both ends of that knob shaft 53. A pinion gear 55 and a drive gear 56 are fixedly mounted on that knob shaft 53 at respective intermediate portions thereof. Therefore, when the knob 54 is manipulated by rotating in the normal or reverse direction, because the pinion gear 55 meshes with the rack 50a of the aforesaid guide rail member 50, the first support member 51 moves forward or rearward slidingly along the rail member 50.

Likewise on the second support member 52, a drive knob shaft 57 is arranged by penetrating therethrough and rotatably bearing, and is provided at an intermediate portion thereof with a pinion gear 59 meshing with the rack 50a of the aforesaid guide rail member 50 side so that the second support member 52 is moved forward or rearward slidingly along the rail member 50 by manipulating knobs 58 fixedly mounted on the left and right both end portions of the knob shaft 57 to rotate in the normal or reverse direction.

In the first support member 51, there are an opening 60 (FIG. 10) for insertion of the photographic lens when attaching, an annular mount 61 fixedly mounted on the front side of that member 51 in concentric relation to the opening 60, a pair of first and second interlocking rings 62 and 63 (FIG. 5) arranged in axial row on the back side of that member 51 to be rotatable concentrically of the aforesaid opening 60, and a receptor 64 for the first and second interlocking rings fixedly mounted on the member 51 and rotatably supporting the first and second interlocking rings 62 and 63. First and second interlocking pawls 62a and 63a are provided respectively in portions of the inner peripheral edges of the first and second interlocking rings 62 and 63 in inward oriented form. First and second interlocking gears 62b and 63b of ring shape are provided respectively on the side surfaces of the first and second interlocking rings 62 and 63 in unison concentrically of the rings. And, the drive gear 56 unified with the drive knob shaft 53 and the second interlocking gear 63b are operatively connected to each other through an interlocking gear train G1-G7. The gears G1 and G2, the ones G3 and G4, and the ones G5 and G6 are a 2-stage gear on a common shaft for unison rotation in each pair. The final gear G7 of the aforesaid gear train G1-G7 (the gear in mesh with the second interlocking gear 63b) and the first interlocking gear 62b are engaged with each other through a differential gear G8 (FIG. 10).

Therefore, when the first support member 51 that is the photographic lens mount support member is slidingly moved forward or rearward along the guide rail member 50 by manipulating the knob 54 to rotate in the normal or reverse direction as has been described above, the power of rotation of the drive gear 56 in the normal or reverse direction is transmitted in interlocking relation to that movement through the gear train G1-G7 to the second interlocking gear 63b and further through the differential gear G8 to the first interlocking gear 63b, so that the first and the second two interlocking rings 62 and 63 are driven to rotate in such a relation that though the angles of rotation are equal to each other, the directions of rotation are opposite to each other.

An electrical signal pin assembly 65 (FIG. 5) is arranged in a portion of the outer surface of the aforesaid ring-shaped mount 61 so that the pin tip end portions are always urged to project by a resilient spring plate member 65a. In the condition that the photographic lens A is normally attached to the opening 60 for photographic lens attachment of the first support member 51, the before-mentioned electrical signal pin assembly 28 of the photographic lens A side normally confronts that electrical signal pin assembly 65 so that the corresponding pins of both the assemblies 65 and 28 are in pressure contact with each other so that both the assemblies 65 and 28 are electrically connected with each other.

A fixed index 66 (FIG. 10) on the outer surface of the upper-most portion of the ring-shaped mount 61 is a mark for registry with the fixed index 32 (FIG. 7 and FIG. 8) on the photographic lens A.

In the second support member 52 as the camera mount support member, there are an opening 67 for attachment of the camera and a ring-shaped mount 68 for attachment of the camera arranged concentrically of the opening 67 on the back side of that member 52 in fixedly secured relation.

A bellows 69 as a black box part of expandable structure is arranged between the first support member 51 and the second support member 52 with its front end portion fixed to the first support member 51 and its rear end portion fixed to the second support member 52 so that the opening 60 for photographic insertion attachment of the first support member 51 side and the opening 67 for camera attachment of the second support member 52 side communicate with each other by a common path in the axial directions.

An electrical signal pin assembly 70 is provided on the aforesaid ring-shaped mount 68 for camera attachment.

By engaging a confront mount (not shown) of the camera C side with the mount 68, the camera C is steadily coupled with, and supported by, the second support member 52.

On the condition that the camera C is normally coupled with and supported by the second support member 52, an electrical signal pin assembly (not shown) of the camera C side correspondingly contacts with the electrical signal pin assembly 70 of the mount 68 side so that both the assemblies are electrically connected to each other.

The above-described electrical signal pin assembly of the second support member 52 side and the before-described electrical signal pin assembly 65 of the first support member 51 side are electrically connected to each other by lead wires (not shown). Therefore, on the condition that the photographic lens A is normally attached to, and supported by, the first support member 51 of the intermediate device B and the camera C to the second support member 52, the electrical circuit of the camera C side and the electrical circuit of the photographic lens A side are in the communicating state with each other.

The bellows 69, when the first support member 51 and/or the second support member 52 are or is moved along the guide rail 50 forward or rearward by normal or reverse rotation manipulation of the knobs 54 or 58 to alter large or small the mutual spacing between the members 51 and 52, changes by extending or retracting depending on the largeness or smallness of the mutual spacing, so that the opening 60 for photographic lens insertion attachment of the first support member 51 side and the opening 67 for camera attachment of the second support member 52 side always lead to, and communicate with, each other by a dark passage along the optical axis.

III. Interlocking of the intermediate device B and the photographic lens A:

When attaching the photographic lens A to the intermediate device B at the first support member 51 that is the photographic lens mount support member, the rear group cam tube 5 portion of the photographic lens A is inserted into the opening 60 for photographic lens insertion attaching of the first support member 51, then the attitude in the angle of rotation of the photographic lens A is adjusted so that the fixed index 32 of the photographic lens A side is placed in registry with the fixed index 66 of the first support member 51 side, then the mount 6 of the photographic lens A side is brought into abutting engagement with the mount 61 of the first support member 51 side, and then the photographic lens A is turned in a clockwise direction sufficiently until it is hindered from further turning by a stopper portion (not shown). (In the device of the present embodiment, the turning operation is about 60°.) By this, with the mutual engagement of the mounts 6 and 61, the photographic lens A is steadily mounted to, and supported on, the first support member 51. In the normal attached position, the photographic lens A comes into such a state in the angle of rotation that the magnification display window hole 31 portion of the exterior ring 1 orients upward, and the electrical signal pin assembly 28 normally confronts the corresponding assembly 65 of the first support member 51 side to electrically communicate with each other.

When, in such a manner, the photographic lens A has been operated by inserting into the opening 60 of the first support member 51 and turning in order to attach the photographic lens A to the first support member 51, the interlocking pawl 27 protruding from the outer surface of the rear group cam tube 5 abuts on the second interlocking pawl 63a of the first support member 51 side and is locked. For this reason, the rear group cam tube 5 and the front group cam tube 3 unified with that cam tube 5 through the key member 25 are stopped from rotating, while the external ring 1, the guide tube 2 joined in unison with this by the screw fasteners, the fixed tube 4 joined in unison with this guide tube 2 by the screw fasteners and the mount 6 mounted in unison with, and fixedly secured to, the flanged portion of the front end of this fixed tube 4 further turn until more movement is hindered by a stopper portion (not shown). By this, the cam tube driving spring 20 tensioned between the projection portion 18 of the front group cam tube 3 and the planted pin 19 of the guide tube 2 comes into an extended state. The expanded plan view of the main parts of FIG. 6 shows the time when the extended state of that spring 20 occurs. In other words, after the photographic lens A has been attached to the first support member 51 of the intermediate device B, the interlocking pawl 27 of the rear group cam tube 5 of the photographic lens A is pressed against the second interlocking pawl 63a of the first support member 51 side and is kept in the abutting state always without any play by the reaction force of the drawn spring 20 as has been described above.

In the state that the photographic lens A is set on the first support member 51 of the intermediate device B and the camera C also is set on the second support member 52, when the first support member 51 is moved forward or rearward on the guide rail member 50 by turning the knob 54 in the normal or reverse direction, the normal or reverse rotating power of the drive gear 56 in response to this is transmitted through the gear train G1-G7 to the second interlocking gear 63b so that the second interlocking ring 63 having the second interlocking pawl 63a is rotated in the normal or reverse direction. Also, the first interlocking gear 62b receives the normal or reverse rotating power through the gear G7 and the differential gear G8, being rotated in the normal or reverse direction in such a relation to the second interlocking gear 63b that the angle of rotation is equal, but the direction of rotation is opposite. Thus, the first interlocking ring 62 having the first interlocking pawl 62a is rotated in the normal or reverse direction. That is, the second interlocking ring 63 having the second interlocking pawl 63a and the first interlocking ring 62 having the first interlocking pawl 62a rotate in the normal or reverse direction in the above-described relation in response to the forward or rearward movement of the first support member 51 along the guide rail member 50.

And, the interlocking pawl 27 of the photographic lens A side always abuttingly engages on either one of the second interlocking pawl 63a of the second interlocking ring 63 or the first interlocking pawl 62a of the first interlocking ring 62 by the reaction force of the spring 20 of the before-mentioned drawn state. Therefore, the rear group cam tube 5 of the photographic lens A is rotated around the outside of the fixed tube 4 in the normal or reverse direction in response to normal or reverse rotation of the second or first interlocking ring 63 or 62 which interlocks the forward or rearward movement of the first support member 51 along the guide rail member 50. And, the front group cam tube 3 unified to this rear group cam tube 5 through the key member 25 is rotated in the normal or reverse direction around the inside of the guide tube 2 together with the rear group cam tube 5. In response to this normal or reverse rotation of the front group and the rear group cam tubes 3 and 5, as has been mentioned before, the first lens group barrel 7 or the first lens group L₁ and the fourth lens group barrel 10 or the fourth lens group L₄ are driven to move along the optical axis each in the separating direction or in the approaching direction from or to the second lens group L₂, the diaphragm D and the third lens group L₃ which remain stationary, thus varying continuously to the lens array of short focal length (the magnification $\beta_1$ or $\beta_3$) of (a) and (c) of FIG. 2, and (a) and (c) of FIG. 3, or to the lens array of long focal length (magnification $\beta_2$ (unity magnification)) of (b) of FIG. 2 and (b) of FIG. 3.

(1) More particularly, in a case where the magnification is varied from the low magnification side (the photographic magnification $\beta_1$) of (a) of FIG. 2 to the high magnification side: $\beta_1 \rightarrow \beta_2 \rightarrow \beta_3$, the knob 54 of the first support member 51 of the intermediate device B is operated by rotating in the normal direction to move the member 51 forward along the guide rail member 50. In the low magnification state where the first support member 51 is closest to the second support member 52 positioned to the rear end portion side of the guide rail member 50 as shown in FIG. 5, the interlocking mechanism of the lens A and the intermediate device B has the interlocking pawl 27 of the lens A side and the second interlocking pawl 63a of the intermediate device B side in contact with each other.

Figure 12:
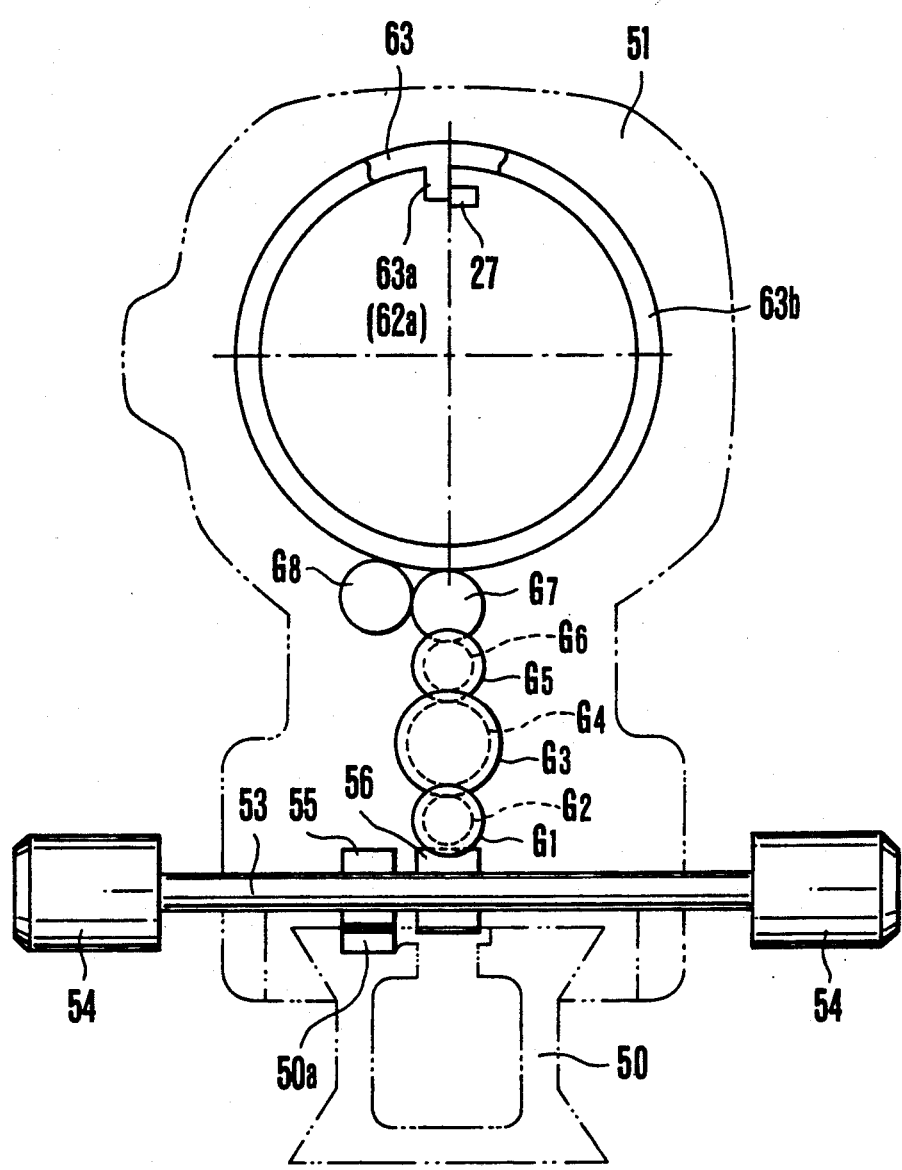

(2) From this state, the first support member 51 of the intermediate device B is moved forward by operating the knob 54 to rotate in the normal direction to an almost middle point in position of the rail member 50 as shown by a double-dot and single-dash line of FIG. 5 where the photographic magnification becomes unity or $\beta_2$. At this time, the interlocking mechanism of the lens A and the intermediate device B become as shown in FIG. 12, so that the interlocking pawl 27 of the lens A side is in contact with the second and the first interlocking pawls 63a and 62a (in the drawing, the pawl 62a is not seen because the pawl 63a is superimposed thereon.)

Figure 13:
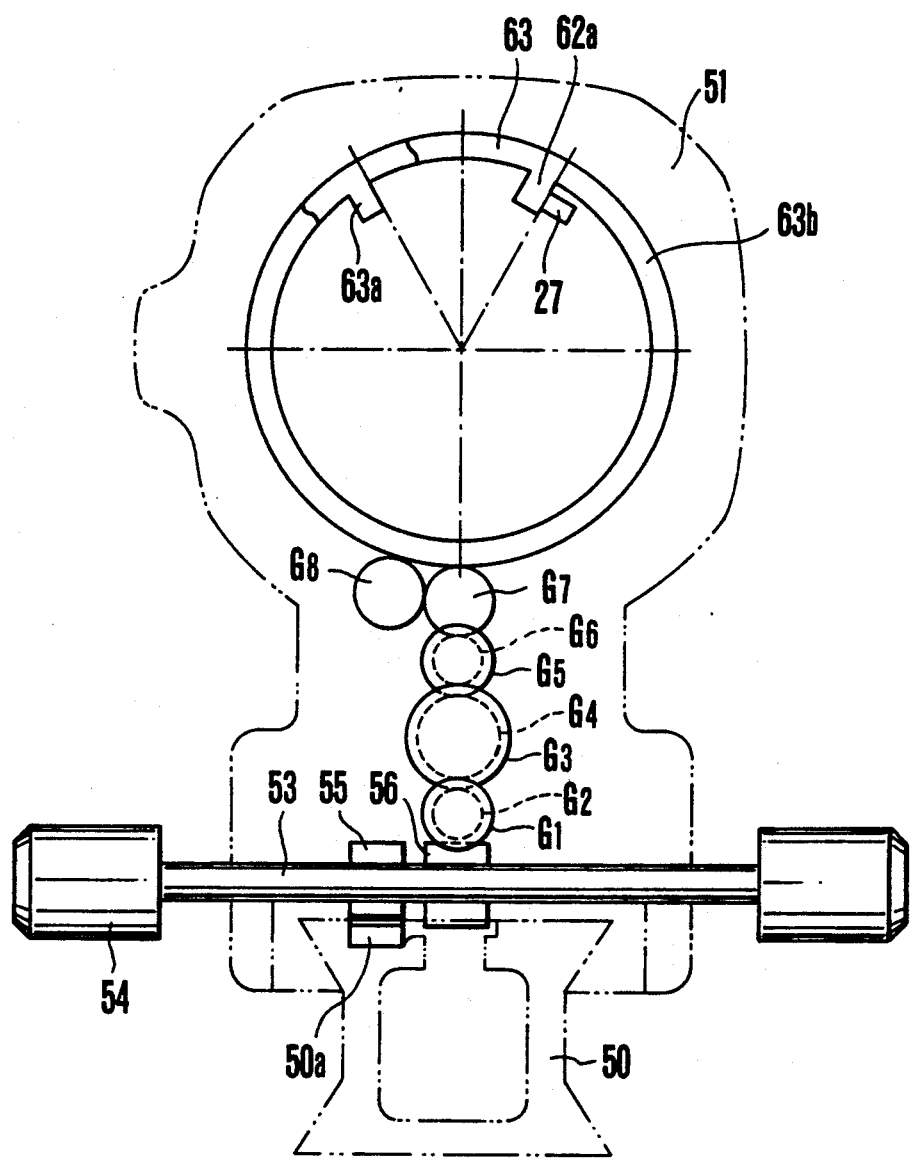

(3) By further rotating the knob 54, the first support member 51 of the intermediate device B is moved forward to a position near the front end of the rail member 50 as shown by a triple-dot and single-dash line of FIG. 5, where the photographic magnification has a higher value $\beta_3$ than the unity magnification $\beta_2$. At this time, the interlocking mechanism of the lens A and the intermediate device B becomes as shown in FIG. 13 so that the interlocking pawl 27 of the lens A side comes into contact with the first interlocking pawl 62a of the intermediate device B side.

In the above-described process, the front group cam tube 5 and the front group cam tube 3 of the photographic lens A in accompaniment with the movement of the interlocking rings 63 and 62 of the intermediate device B rotate in the reverse direction as the photographic magnification varies from the low value $\beta_1$ to unity $\beta_2$ and from unity $\beta_2$ to the high value $\beta_3$. And, all the lens groups L₁-L₄ and the diaphragm D move as shown in FIG. 3. Also the movement of all the lens groups L₁-L₄ and the diaphragm D relative to the predetermined image plane F (the film plane within the camera C) is shown in FIG. 2.

Further, since the front group urging spring 17 is used between the first lens group barrel 7 and the exterior ring 1, because the first lens group barrel 7 is urged in the elongating direction, it helps the pin shaft 16 penetrating the helical cam slot 15 of the front group cam tube 3 move in the elongating direction of the spring 17 by the urging force. Also, because, at the same time, the position of the pin shaft 16 to the helical cam slot 15 is pressed on one side by the urging force, the position of the pin shaft 16 is determined with high accuracy.

Also, since the rear group urging spring 24 is provided between the fourth lens group barrel 10 and the end portion of the fixed barrel 4, because the fourth lens barrel 10 is urged to the elongating direction, it helps the pin shaft 23 fitted in the helical cam slot 22 of the rear group cam tube 5 move in the elongating direction of the spring 24. Also, because, at the same time, the pin shaft 23 is pressed on one side of the helical cam slot 22 by the urging force, the position of the pin shaft 23 is determined with high accuracy.

The magnification display plate 30 in accompaniment with the above-described alteration of the magnification by the normal or reverse rotation of the operating knob 54 that causes the front group cam tube 3 to rotate in the normal or reverse direction, rotates in unison with that cam tube 3 so that the magnification value in the display corresponding to the current position on the guide rail member 50 to which the first support member 51 of the intermediate device B has moved by the rotating operation of the knob 54 takes its place in the upward pointed window hole 31 provided in the wall of the exterior ring 1 so that the magnification value at the present time point is accurately displayed in registry with the index 31b (FIG. 7).

Figure 14:
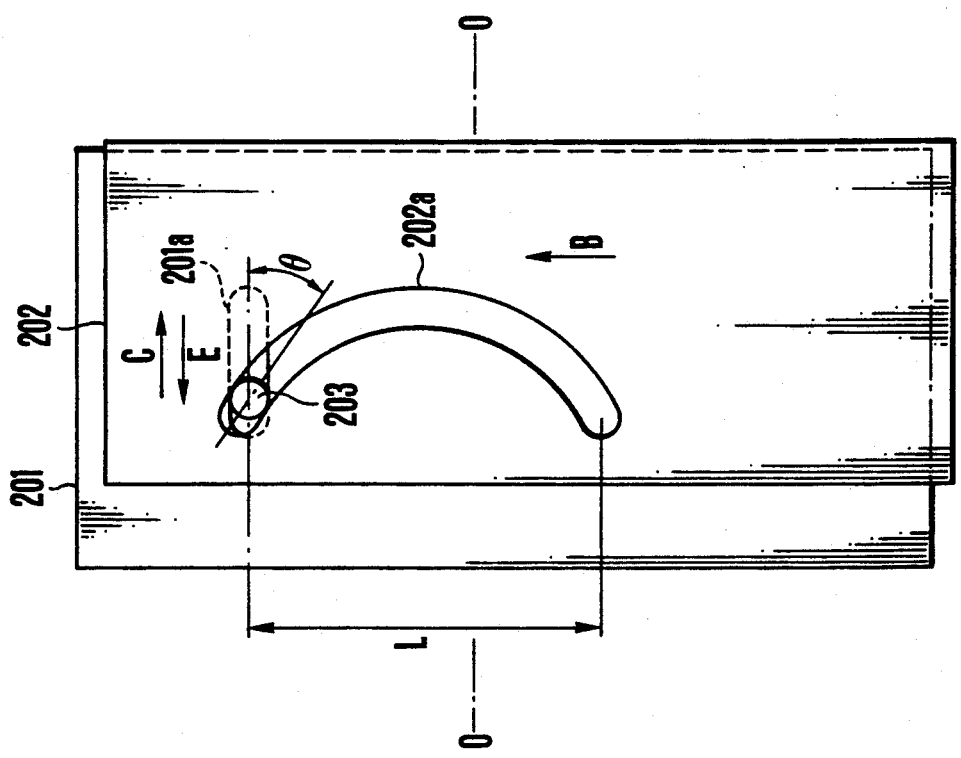
FIG. 14 is an expanded plan view of the main parts of the conventional cam mechanism.

Thus, the photographic lens (lens barrel) A of the present embodiment in the form of the lens barrel for close-up photography which is so constructed that the focal length is altered in interlocking relation to the amount of extension of the intermediate device B for close-up has the cam tubes 3 and 5 as the cam means for moving the variable magnification lens groups and the pins 16 and 23 for the cam slots 15 and 22 arranged to move in a reciprocating manner, whereby:

(i) as compared with that shown in FIG. 14, the cross angle 0 of the cam is made possible to increase as shown in FIG. 6, giving an advantage that the varifocal length groups $L_1$ and $L_4$ move smoothly and the position accuracy of the varifocal lens groups is improved; and (ii) it has been realized to form such an angle of rotation of the cam tubes 3 and 5 that within the angle necessary to attach the photographic lens A to the intermediate device B, the initial setting of the interlocking members 63a, 62a and 27 of the intermediate device B side and the photographic lens A side can be done.

As has been described above, moving means is provided so that during the extending or retracting operation of one direction of the intermediate device, after the variable magnification lens group has been moved from the first position to the second position by the cam of the cam means, it is reversely moved from the second position to the first position on the locus of that cam, arrangement of the cam slot in the cam means (cam tubes) becomes easy so that the angle the tangent of the cam slot makes with the straight slot has a relatively large value, thereby giving an advantage in that the cam follower moves smoothly and the position accuracy is excellent.

Figure 15:
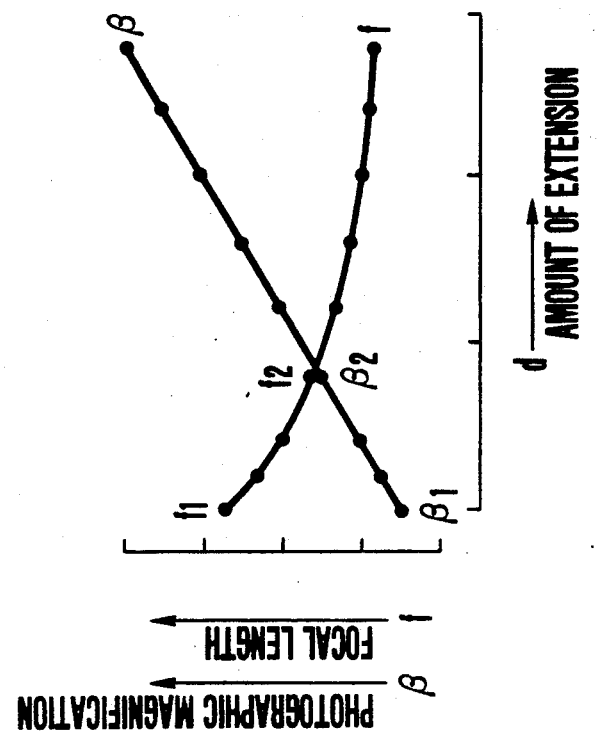
FIG. 15 is a graph of another operational principle of close-up photography.

The graph of FIG. 15 concerns the before-described (1) equation, that is, $$\beta = Y/Y_0 = b/a = d/f \ldots \quad (1).$$

If the focal length f of the photographic lens is made to decrease monotonously as the amount of extension d of the lens increases, it is possible that the photographic magnification $\beta$ for the same amount of extension d gets higher than when the method of not varying the focal length f is employed. That is, this means that even when the same intermediate device for close-up photography is used, the magnification range in which photography is possible can be widened. Therefore, by decreasing the focal length of the photographic lens in response to the operation of increasing the amount of extension d, or by increasing the focal length f in response to the operation of decreasing the amount of extension d, it is made possible to extremely improve the photographic management of wide magnification range.

FIG. 16 is an optical system model diagram of an example of the varifocal photographic lens A as the photographic lens, where $L_1$, $L_2$, $L_3$ and $L_4$ are lens groups each constructed with one lens or a plurality of lenses, and D stands for a diaphragm. By moving the first lens group $L_1$, the second lens group $L_2$, the third lens group $L_3$, the fourth lens group $L_4$ and the diaphragm D, focal length alteration or magnification variation is performed.

Each lens position state of (a) or (b) of FIG. 16 shows the position state for the focal length $f_1$, or $f_2$ on the graph of FIG. 15. That is, the second lens group $L_2$, the third lens group $L_3$ and the diaphragm D move in unison linearly. The first lens group $L_1$ and the fourth lens group $L_4$ move in entirely symmetric way to each other with respect to the second lens group $L_2$, the third lens group $L_3$ and the diaphragm D and when in the low magnification state the respective lens spacings become nearest, ((a) of FIG. 16). Further, the first lens group $L_1$ and the fourth lens group $L_4$ are so arranged that their relative axial movements to the second lens group $L_2$, the third lens group $L_3$ and the diaphragm D become equal to each other. That is, the positions for each of the aforesaid values of magnification of the first lens group $L_1$ and the fourth lens group $L_4$ relative to the second lens group $L_2$, the third lens group $L_3$ and the diaphragm D become as shown in FIG. 17. Also at all the aforesaid values and any other values of photographic magnification therebetween, the distance between the object and the predetermined image plane is always constant. Therefore, once the sharp focus is established, later variation of the magnification does not require re-variation of focus.

On the optical system of the photographic lens A, in order to perform such a movement as described above, the movement of the second lens group $L_2$, the third lens group $L_3$ and the diaphragm D is performed by the intermediate device B, while the movement of the first lens group $L_1$ and the fourth lens group $L_4$ is performed by operating the cam mechanism fixedly secured to the movable side of the intermediate device B, so that such a movement of the first lens group $L_1$ and the fourth lens group $L_4$ as shown in FIG. 16 is realized by the combination of the movement of the intermediate device B and the movement of the cam mechanism.

The photographic lens (lens barrel) A in the above-described embodiment has the cam mechanism for moving the variable magnification lens groups $L_1$ and $L_4$, and the cam tubes 3 and 5 as the movable members of that cam mechanism are urged by the urging spring member 20 always to turn in one direction, causing the interlocking members of both sides of the photographic lens and the intermediate device having that lens attached to always resiliently abuttingly engage with each other. Therefore, (i) it has become possible that the operation of attaching the photographic lens A to the intermediate device B leads to the accurate initial setting of the interlocking members of both A and B sides, and (ii) it has become possible to remove the play by taking the mechanical backlash off the interlocking members of the intermediate device B and the photographic lens A.

As has been described above, by providing a mechanism for urging those movable members of the cam means in one direction which perform movement of the variable magnification lens groups of the lens barrel in response to extension or retraction of the intermediate device, it has been made possible that when the intermediate device and the lens barrel are attached to each other, the accurateness of the initial setting of the interlocking members of both sides is secured, and the mechanical backlash and "play" at the time of the attaching operation is removed.

Also, as for the lens barrel for close-up photography used by attaching to the bellows type intermediate device of the close-up photography device, the lens barrel itself is provided with a magnification display portion, this display portion being arranged to display the value of the magnification corresponding to the magnification varied position of the magnification variable lens groups moved by the distance depending on the amount of expansion of the intermediate device as the intermediate device interlocks with the lens barrel as has been described above. Therefore, the magnification display is very easy to view and its displayed magnification is accurate. Because there is no need for a new mechanism for magnification display, a cheap magnification display has become possible.

As has been described above, the device of the present embodiment enables the focal length of the photographic lens (varifocal photographic lens), or the photographic magnification, to alter in automatic response to the extending or retracting operation of the intermediate device without having to change the shooting distance from the object plane to the image plane, or without having to move the position of the camera. Hence, the above-described conventional problems are eliminated, and the manageability at the time of shooting and attaching or detaching of the photographic lens can be made excellent. Further, it is also possible to prevent damage from the device exterior.

What is claimed is:

1. A close-up photography device comprising:
   an intermediate device of extensible and retractable type adapted to be mounted on a camera body; and
   a lens barrel for close-up photography adapted to be mounted on said intermediate device and arranged to be able to vary at least a focal length for variable-magnification photography,
   said intermediate device having a first moving member arranged to move according to the amount of extension or retraction,
   said lens barrel having a second moving member arranged to move to vary the focal length,
   said first moving member and said second moving member being arranged to be interlocked with each other when said lens barrel is mounted on said intermediate device,
   an interlocking relation between said first moving member and said second moving member being set so that the focal length of said lens barrel is varied so as not to change a focusing state at an image forming position of the camera body by the extension or retraction of said intermediate device,
   said lens barrel being attachable and detachable with respect to said intermediate device, and having a lens group which changes the focal length by moving in an optical axis direction on the basis of the movement of said second moving member, the movement in the optical axis of the lens group being effected by the movement of the lens barrel as a whole in the optical axis direction and the movement of the second moving member being caused by the extension or retraction of the intermediate device.

2. A device according to claim 1, wherein said first moving member and said second moving member are interlocked with each other by a cam.

3. A device according to claim 1, wherein variation of the focal length of said lens barrel to be performed in association with the extension or retraction of said intermediate device is performed while keeping unvaried a distance between an object and the image forming position of the camera body.

4. A lens barrel for close-up photography adapted to be mounted on an intermediate device of extensible and retractable type used for close-up photography, the lens barrel being attachable and detachable with respect to the intermediate device, and the intermediate device being extendable and retractable to move the lens barrel as a whole in an optical axis direction, comprising:
   a lens moving mechanism for moving a lens group capable of varying a focal length in a direction of an optical axis; and
   interlocking means for interlocking said lens moving mechanism with an extending or retracting operation of said intermediate device,
   said lens moving mechanism varying the focal length so as not to change a focusing state at an image forming position of a camera body,
   said lens group being moved in the optical axis direction by the movement of the lens barrel as a whole in the optical axis direction and the movement of the lens moving mechanism being caused by the extension or retraction of the intermediate device.

5. A lens barrel according to claim 4, wherein said lens moving mechanism includes a cam, and wherein a movement of said lens group is performed by said cam in response to the extension or retraction of said intermediate device.

6. A lens barrel according to claim 4, wherein said lens moving mechanism and said intermediate device are interlocked with each other while being engaged with each other by being urged by a spring member.

7. A lens barrel according to claim 4, wherein said lens barrel and said intermediate device respectively have a mount so as to permit their mutual mounting and dismounting.

8. A lens barrel according to claim 7, wherein said lens moving mechanism includes a cam, and where a movement of said lens group is performed by said cam in response to the extension or retraction of said intermediate device.

9. A lens barrel for close-up photography adapted to be mounted on an intermediate device of extensible and retractable type used for close-up photography, the lens barrel being attachable and detachable with respect to the intermediate device, and the intermediate device being extendable and retractable to move the lens barrel as a whole in an optical axis direction, comprising:

a lens moving mechanism for moving a lens group capable of varying a focal length in said optical axis direction; and cam means for interlocking said lens moving mechanism with an extending or retracting operation of said intermediate device, said cam means being set so that during the extending or retracting operation in one direction of said intermediate device, a cam follower driven by a cam is moved from a first position to a second position and, after that, is moved from said second position to said first position, said lens group being moved in the optical axis direction by the movement of the lens barrel as a whole in the optical axis direction and the movement of the lens moving mechanism being caused by the extension or retraction of the intermediate device.

10. A lens barrel according to claim 9, wherein said lens moving mechanism and said intermediate device are interlocked with each other while being engaged with each other by being urged by a spring member.

11. A lens barrel for close-up photography adapted to be mounted on an intermediate device of extensible and retractable type used for close-up photography, the lens barrel being attachable and detachable with respect to the intermediate device, and the intermediate device being extendable and retractable to move the lens barrel as a whole in an optical axis direction, comprising:

a lens moving mechanism for moving a lens group capable of varying a focal length in said optical axis direction;

interlocking means for interlocking said lens moving mechanism with an extending or retracting operation of said intermediate device; and a magnification display part disposed at said lens barrel, said magnification display part being arranged to display magnification in response to a movement of said interlocking means, said lens group being moved in the optical axis direction by the movement of the lens barrel as a whole in the optical axis direction and the movement of the lens moving mechanism being caused by the extension or retraction of the intermediate device.

12. A lens barrel according to claim 11, wherein said magnification display part has a scale ring arranged to rotate around the optical axis, the magnification being displayed by the turning of said scale ring.

* * * * *